(No Model.) 2 Sheets—Sheet 1.

J. B. JARDINE.
APPARATUS FOR REDUCING BITUMINOUS ROCK, &c.

No. 428,251. Patented May 20, 1890.

Witnesses,
Geo. H. Strong
J. H. Arnuse

Inventor,
Joseph B. Jardine
By Dewey & Co.
Attys

THE NORRIS PETERS CO., PHOTO-LITHO., WASHINGTON, D. C.

(No Model.) 2 Sheets—Sheet 2.

J. B. JARDINE.
APPARATUS FOR REDUCING BITUMINOUS ROCK, &c.

No. 428,251. Patented May 20, 1890.

Witnesses:
Geo. H. Strong
J. H. Krouse

Inventor,
Joseph B. Jardine
By Dewey & Co.
Att's

UNITED STATES PATENT OFFICE.

JOSEPH B. JARDINE, OF SAN FRANCISCO, CALIFORNIA.

APPARATUS FOR REDUCING BITUMINOUS ROCK, &c.

SPECIFICATION forming part of Letters Patent No. 428,251, dated May 20, 1890.

Application filed September 21, 1889. Serial No. 324,705. (No model.)

*To all whom it may concern:*

Be it known that I, JOSEPH B. JARDINE, a citizen of the United States, residing in the city and county of San Francisco, State of California, have invented an Improvement in Apparatus for Reducing Bituminous Rock, Asphaltum, and other Substances; and I hereby declare the following to be a full, clear, and exact description of the same.

My invention relates to that class of devices for melting or softening bituminous rock, asphalt, and other substances used for paving, roofing, &c., in which the material is confined in a kettle, and is reduced by the action of steam; and my invention consists in the novel details of arrangement and construction of the kettle, hereinafter fully described, and specifically pointed out in the claims.

The object of my invention is to provide a simple and effective kettle for this purpose.

Figure 1:
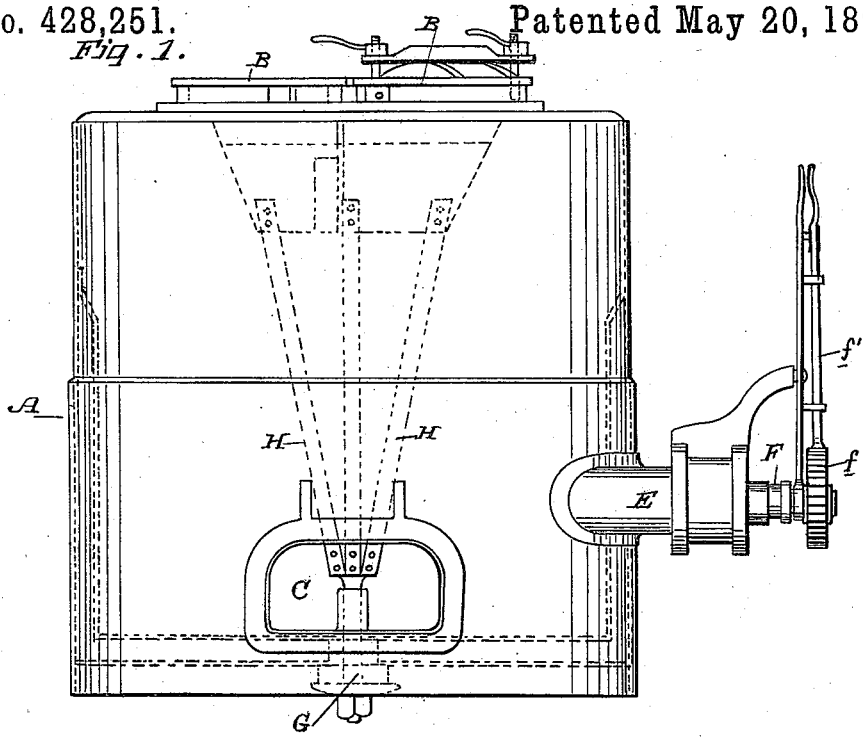
Figure 2:
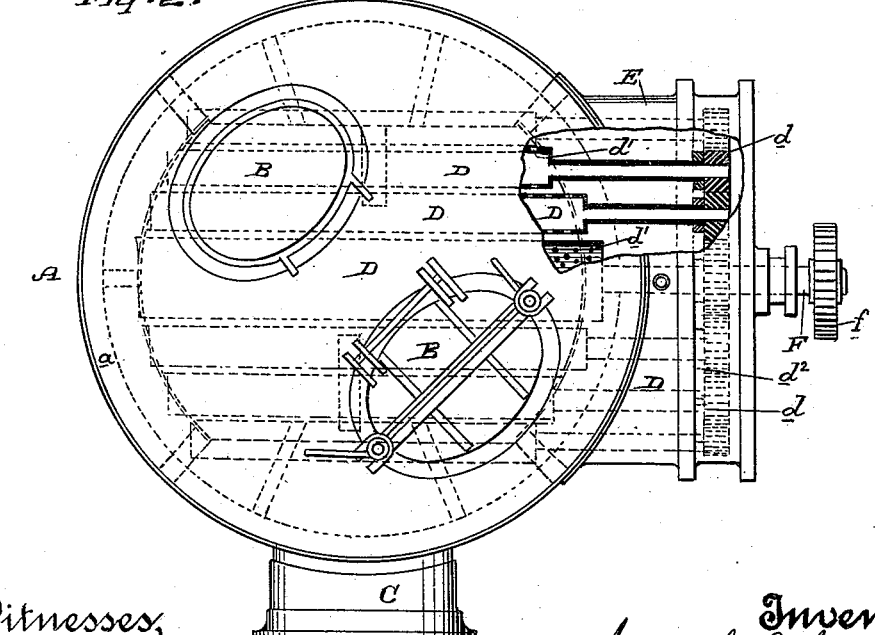
Figure 3:
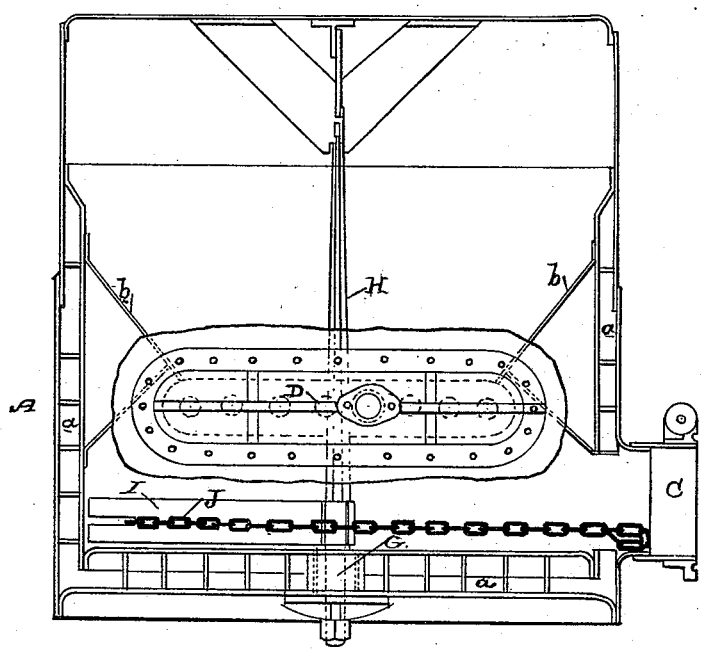

Referring to the accompanying drawings for a more complete explanation of my invention, Figure 1 is an elevation of my kettle. Fig. 2 is a plan of same. Fig. 3 is a vertical section.

A is the kettle, having double walls, so as to form a space $a$ around its sides and under it. To this space live steam is admitted of any suitable pressure. In the top of the kettle are the feed-doors B, which communicate with suitable directing-hoppers $b$, and in its side near its bottom is the exit-door C. Mounted horizontally in the kettle near its lower portion are rolls D, which project at one end into a steam-chamber E on the side of the kettle and carry gears $d$, lying within said steam-chamber and intermeshing, all being driven by a geared shaft F, projecting to the outside and adapted to be driven either continuously or, as here shown, intermittently by means of a ratchet $f$ and ratchet-lever $f'$. The rolls D are made hollow or tubular, open at the end which lies within the steam-chamber E, and provided with apertures or holes $d'$ in that portion which lies within the kettle. The gears $d$ work against steam-tight collars $d^2$, which prevent the live steam from getting into the kettle when dry cooking is wanted.

G is a vertical bolt or pin passing centrally into the kettle through its bottom. To the upper end of this bolt are secured the upwardly-divergent braces H, which are secured at their upper ends to the upper portion of the kettle, their function being to stiffen said kettle.

Upon the bolt or pin G is pivoted a revolving scraper I, consisting of a flat bar set up on edge. This scraper has a length approximating the radius of the kettle, so that it can freely revolve therein, and it travels over the bottom of the kettle. To its outer end is secured a chain J, which extends on each side within the kettle to the discharge-door C.

The operation of the kettle is as follows: The material is fed to the kettle through the doors B in its top and drops through the hoppers upon the rolls D. Live steam is admitted to the space $a$, thereby reducing the contents of the kettle. The rolls D are for crushing and breaking any pieces which are not heated through. The normal position of the scraper I is at the back of the kettle, as shown in Fig. 3. Now, when it is desired to draw off from the space under the rolls the reduced material, the exit-door C is opened, and the chain J is taken hold of and pulled, so as to swing the scraper forward through a half-revolution, thereby causing it to push forward the material to the front. Then, by pulling on the other side of the chain, the scraper is moved back and around on the other side to push the material on that side forwardly. When moist cooking is required, live steam is admitted to the chamber E, and from thence passes into the hollow rolls and out through their perforations directly into the mass of material in the kettle.

Having thus described my invention, what I claim as new, and desire to secure by Letters Patent, is—

1. In an apparatus for reducing rock, asphaltum, &c., the closed reducing-kettle, and the crushing or breaking rolls within above its bottom wall, substantially as described.

2. The reducing-kettle having a feed-door in its top and a discharge-door in its lower side, in combination with the series of hollow breaking and crushing rolls within the kettle and upon which the material is delivered, substantially as herein described.

3. The reducing-kettle, in combination with the series of hollow perforated crushing and breaking rolls within the kettle, said rolls having a steam-connection, whereby steam may be passed through them into the kettle, substantially as herein described.

4. The reducing-kettle having upon its side a chamber E, to which steam is supplied, in combination with the series of hollow perforated crushing and breaking rolls within the kettle, their ends projecting into and communicating with the chamber E, whereby steam may be passed through them into the kettle, substantially as herein described.

5. The reducing-kettle having upon its side the chamber E, to which steam is supplied, in combination with the hollow perforated crushing and breaking rolls within the kettle, their ends projecting into and communicating with the chamber E, the gears on the roll ends within said chamber, and the drive-shaft for operating the gears and rolls, substantially as herein described.

6. The reducing-kettle having the discharge-door C, in combination with the centrally-pivoted scraper I, revolving horizontally within the kettle and adapted to push the reduced material to the discharge-door, substantially as herein described.

7. The reducing-kettle having the discharge-door C, in combination with the centrally-pivoted scraper I within the kettle, and the chain K for revolving the scraper, substantially as herein described.

8. The reducing-kettle, in combination with the central bottom bolt, and the upwardly-divergent braces secured thereto and to the upper portion of the kettle, substantially as herein described.

9. The reducing-kettle having the discharge-door C, in combination with the central bottom bolt or pin, the upwardly-divergent braces secured thereto and to the upper portion of the kettle, the scraper pivoted upon the bolt or pin, and the chain for revolving the scraper, substantially as herein described.

10. An apparatus for reducing bituminous rock, asphaltum, &c., consisting of the kettle A, having feed-doors in its top, and a discharge-door at the bottom of its side, the series of crushing or breaking rolls within the kettle, the centrally-pivoted scraper in the bottom of the kettle, and the chain for operating said scraper, substantially as herein described.

11. An apparatus for reducing bituminous rock, asphaltum, &c., consisting of the kettle A, having feed-doors in its top, and a discharge-door at the bottom of its side, the series of hollow perforated crushing and breaking rolls mounted in the kettle, the steam-chamber on the side of the kettle, into which the rolls project and with which they communicate, the driving-gears of the rolls within the steam-chamber, the centrally-pivoted scraper in the bottom of the kettle, and the chain for operating it, substantially as herein described.

In witness whereof I have hereunto set my hand.

JOSEPH B. JARDINE.

Witnesses:
S. H. NOURSE,
J. H. BLOOD.